Patented Sept. 26, 1950

2,523,377

UNITED STATES PATENT OFFICE 2,523,377

PREPARATION OF CELLULOSE ETHERS

Eugene D. Klug, Wilmington, Del., assignor to Hercules Powder Company, Wilmington, Del., a corporation of Delaware No Drawing. Application December 24, 1946, Serial No. 718,261

5 Claims. (Cl. 260—231)

This invention relates to the manufacture of cellulose ethers and, more particularly, to a method for adjusting the viscosities of cellulose ethers.

Viscosity and substitution are the two major properties of a cellulose ether which determine its utility. Substitution is largely determined by the ratio of etherifying reagents to cellulose and by the identity of the etherifying reagent. The viscosity of a cellulose ether has heretofore been regulated by etherifying celluloses of varying viscosities, by aging the alkali cellulose from which the ether is prepared, by the addition of air or oxygen to the ethylation reactor, or by hydrolyzing the cellulose ether. Each of these methods involves certain inherent disadvantages.

For example, it was necessary for a manufacturer to keep a large variety of celluloses on hand if he wished to use the original viscosity of the cellulose as a means for controlling the viscosity of the cellulose ether. The aging of alkali cellulose involves exact control of a complex set of factors, such as temperature, time, caustic concentration, etc. The sensitivity of cellulose to these influences is such that even the best of control is often inadequate. The addition of air or oxygen is quite effective but its usefulness is limited by the fact that control of the viscosity is not good; i. e., it is difficult to obtain products of exactly the viscosity required. Hydrolysis of cellulose ethers by heating in the presence of acids results in the formation of products which are usually unstable, since the acid treatment removes certain stabilizing constituents of the cellulose ether.

Now, in accordance with this invention, the viscosity of cellulose ethers is regulated by etherifying cellulose in the presence of a compound selected from the group consisting of hydrogen peroxide, an alkali-metal hypobromite, hypochlorite, hypoiodite, peroxide, or periodate. In carrying out the invention, the other ingredients of the etherifying mixture are chosen so that the alkali-metal compound does not react substantially therewith, only the viscosity of the cellulose ether being affected by the presence of said compound.

The following examples illustrate the use of this invention in the preparation of various cellulose ethers:

Example 1

High viscosity cellulose (20 grams) was heated with ethyl chloride (86 grams), sodium hydroxide (108 grams), sodium hypochlorite (0.65 gram), and water (112 grams). The heating schedule consisted of gradual warming up to 140° C. over an 8-hour period, followed by continued heating at 140° C. for an additional 8 hours. The volatile organic materials (ethyl ether, ethyl alcohol, and residual ethyl chloride) were removed by distillation under diminished pressure, causing the ethyl cellulose formed during the heating period to be precipitated in the remaining aqueous medium. The precipitated ethyl cellulose was washed to neutrality and dried at 70° C. in a vacuum oven. The product had an ethoxyl content of 42.5% and a viscosity of 60 centipoises when measured in a 5% solution of 80:20 benzene:alcohol at 25° C.

The effect of omitting hypochlorite from the ethyl cellulose reaction mixture was determined by duplicating the above reaction in all respects except that the hypochlorite was omitted. The product obtained had substantially the same ethoxyl content as before and a viscosity of 1350 centipoises.

Example 2

High viscosity cellulose (450 grams) was heated with ethyl chloride (1800 grams), 50% aqueous sodium hydroxide solution (4500 grams) and 20 milliliters of 31.6% aqueous hydrogen peroxide solution. The heating schedule consisted of warming up to 130° C. over a 1-hour period followed by continued heating at 130° C. for an additional 3 hours. The volatile organic materials (ethyl ether, ethyl alcohol, and residual ethyl chloride) were removed by distillation under diminished pressure, causing the ethyl cellulose formed during the heating period to be precipitated in the remaining aqueous medium. Ethyl chloride was continuously added and approximately 2000 grams of this material was consumed. The precipitated ethyl cellulose was washed to neutrality and dried at 70° C. in a vacuum oven. The product had an ethoxyl content of 48.2% and a viscosity of 35.2 centipoises when measured in a 5% solution of 80:20 benzene:alcohol at 25° C. Ethyl cellulose prepared under the same conditions without hydrogen peroxide was so viscous in a 5% solution of 80:20 benzene:alcohol at 25° C. that an accurate viscosity determination could not be made. The viscosity was undoubtedly of the order of several thousand centipoises.

Example 3

High viscosity cellulose (1.72 pounds) was heated with a mixture of sodium hydroxide (2.1 pounds), sodium hypochlorite (0.021 pound), monochloracetic acid (2.5 pounds), and water (5.0 pounds). The heating period consisted of raising the temperature to 50° C. in 1 hour, followed by continuous heating at 50° C. for 5 hours. The carboxymethylcellulose formed during the above reaction was precipitated by the addition of methyl alcohol. The precipitated material was washed with 70% methyl alcohol, dehydrated with anhydrous methyl alcohol, and dried in an air oven at 100° C. The product contained 0.72 carboxymethyl groups per anhydroglucose unit and had a viscosity of 16.5 centipoises in 2% aqueous solution at 25° C.

When the above reaction was duplicated, omitting hypochlorite from the reaction mixture, the resulting product had substantially the same substitution as before and a viscosity of 660 centipoises.

*Example 4*

The reaction of Example 3 was duplicated except that the amount of sodium hypochlorite used was 0.017 pound. The product had a viscosity of 107 centipoises in 2% aqueous solution at 25° C. as compared to a viscosity of 660 centipoises when no hypochlorite was used.

*Example 5*

The reaction of Example 3 was again duplicated except that this time the amount of sodium hypochlorite used was increased to 0.029 pound. The product had a viscosity of 5.7 centipoises in 2% aqueous solution at 25° C. as compared to a viscosity of 660 centipoises when no hypochlorite was used.

Certain other compounds may be added to the cellulose etherification reaction mixture instead of, or in addition to, the sodium hypochlorite used in Examples 1 and 3 and the hydrogen peroxide used in Example 2. These are the alkali-metal hypochlorites, hypobromites, hypoiodites, peroxides, and periodates, usually the sodium or potassium compounds. These compounds have been found to be suitable for addition to the cellulose etherification reaction mixture since they effectively reduce the viscosity of the cellulose ether and since any unused oxidant and its byproducts may be readily removed during the ordinary process of washing cellulose ethers. The viscosity-regulating agent may be added at the beginning of the etherification step or during the initial stages of etherification. Addition of the agent after the major portion of substitution has been accomplished will not produce the desired regulated viscosity reduction and is not contemplated. When the agent is relatively stable in solid form, it may be added as a solid material. Preferably, however, it is added in aqueous solution. When sodium hypochlorite is the agent, it is preferably prepared by bubbling chlorine into concentrated sodium hydroxide solutions immediately prior to use in an etherification reaction mixture. Sodium hypochlorite is the agent most highly preferred.

The viscosity-regulating agent will be added to the reactants in such an amount that a desired viscosity of the product is obtained. The controlling factor for a given ratio of other etherification reactants is the ratio of reagent to cellulose. This ratio may be from about 0.01 to about 0.25 mole of the reagent per anhydroglucose unit and, preferably, is from about 0.05 to about 0.1 mole. Since the viscosity of the product varies sharply with the proportion of viscosity-regulating agent present as illustrated in the examples, and since the proportion of agent present is a factor capable of exact determination, very close control of cellulose ether viscosities is possible. The exact amount for any given desired viscosity will, of course, vary with the agent and the particular process and is determined readily by trial for each process. An amount to give a predetermined product viscosity is then used.

In carrying out the present invention, the etherification reaction mixture may consist of cellulose, alkali, water, etherifying agent, and viscosity-reducing agent. The cellulose used in the formation of cellulose ethers is preferably one having a high degree of purity. A preferred form is cotton linters, since they are usually available in readily etherifiable condition and are a highly pure form of cellulose. However, other cellulosic materials may be employed, such as purified wood pulps, preferably containing a high percentage of alpha-cellulose, and for certain purposes comminuted wood, such as wood flour, sawdust, etc., may be employed.

While the etherification may be arranged to run continuously, preferably, it is conducted as a batch process. In the first instance, the cellulose may be etherified in the form of a continuous felted sheet, while, in the batch process, the cellulose is preferably in the form of dispersed fibers or particles. The particles may be obtained by use of various comminuting devices in reducing a felted sheet of cellulosic material to the proper form.

The present invention is not confined to the use of any particular type of etherifying agent. Alkyl sulfates, such as dimethyl and diethyl sulfates; halides, such as methyl chloride, ethyl chloride, benzyl chloride, butyl chloride, ethylene chlorohydrin; and oxides, such as ethylene oxide and propylene oxide, are suitable for preparation of the various cellulose ethers. Other cellulose ethers, such as the carboxyalkyl ethers of cellulose, may be prepared by the present invention. These include carboxymethylcellulose and the alkali-metal salts thereof and carboxyethylcellulose. In the preparation of carboxymethylcellulose, the etherifying agent is usually a halogenated lower fatty acid or one of its salts, such as sodium monochloroacetate. The proportions of etherifying agent to cellulose are a factor in the substitution of the cellulose ether. Normally, the proportions will be from about 0.1 mole to about 10 moles etherifying agent per anhydroglucose unit. When preparing ethyl cellulose, for example, the product obtained may have a substitution from less than 1 to about 2.8 ether groups per anhydroglucose unit. In preparing ethyl cellulose, and using ethyl chloride as the etherifying agent, the ratio of ethyl chloride to cellulose varies from about 2 moles to about 8 moles ethyl chloride per anhydroglucose unit. In the preparation of carboxymethylcellulose, products are obtained having substitution from about 0.1 to about 1.2. Consequently, if monochloroacetic acid is the etherifying agent, the ratio of acid to cellulose varies from about 0.1 mole to about 3 moles acid per anhydroglucose unit of the cellulose. In the preparation of other cellulose ethers, similar amounts of etherifying agent are used.

The alkalies which may be used in the preparation of cellulose ethers are also well known in the art. Sodium hydroxide is the preferred alkali but other strong alkalies, such as potassium hydroxide, lithium hydroxide, and quaternary ammonium bases, may be used in place thereof. The relation of the amount of caustic to the other ingredients of the reaction mixture is an important factor of the reaction in the substitution of the product. If dilute caustic is used, the product is usually one of low substitution. If a low proportion of caustic is used, a product of low substitution will likewise result. However, the concentration of the caustic may vary within wide limits, dependent upon the type of cellulose ether which is desired. The concentration of caustic in water present in the reaction mixture will vary from about 5 to about 75%. In the preparation of ethyl cellulose having an ethoxyl content of 43.5–50%, the concentration of caustic in water will vary from about 35% to about 70%. These concentrations are based upon the amount of caustic and water present in the whole etherification mixture and not upon the ratio of the two substances as they may be added initially to the cellulose. They may be added to the cellulose in the form of solids or dilute solutions, and steps may be taken to subsequently arrive at the concentration of caustic which is desired in the etherification reaction. If dilute solutions are used, for example, the alkali cellulose may be pressed to remove part of the caustic solution. The solution so removed is usually considerably more dilute than that which was added to the cellulose. If solid or highly concentrated solutions have been added to the cellulose, the subsequent addition of water will bring the concentration of caustic to that desired during etherification. A common practice is that of adding a more or less dilute solution of the caustic together with solid caustic in flake or powdered form.

Many procedures for the preparation of cellulose ethers involve the use of the aging step for the alkali cellulose hereinbefore described. The addition of a viscosity-regulating agent to the etherification reaction mixture eliminates any need for an aging procedure.

The time of etherification will vary considerably with the temperature of the reaction and the ingredients of the reaction mixture. The preparation of ethyl cellulose, for example, requires from about 3 hours to about 30 hours and, preferably, is carried out over a period of not less than about 6 hours and not more than about 15 hours. On the other hand, the preparation of carboxymethylcellulose may be carried out in a time varying from about 2 hours to about 24 hours.

The temperature of the etherification reaction may also vary within wide limits, dependent upon the cellulose ether to be used and upon the etherifying agent as well as other factors. In the preparation of ethyl cellulose, temperatures from about 25° C. to about 200° C. are used. Carboxymethylcellulose is prepared at generally lower temperatures, the temperature of carboxymethylation varying from about 20° C. to about 75° C.

Since the amount of viscosity-regulating agent added to the cellulose etherification reaction mixture may be accurately measured, the viscosity of the cellulose ether formed by use of the present invention is capable of a similar degree of regulation. Medium and low viscosity ethers are readily produced without previous degradation of the cellulose raw material or aging of alkali cellulose. For example, ethyl cellulose having a viscosity from about 5 centipoises to about 600 centipoises or more (in 5% solution at 25° C. in 80:20 toluene:alcohol) and sodium carboxymethylcellulose having a viscosity from about 2 centipoises to about 600 centipoises or more in 2% aqueous solution are easily obtained at a predetermined desired viscosity.

The cellulose ethers which may be produced according to the present invention include methyl, ethyl, propyl, and butyl cellulose, benzyl cellulose, carboxymethylcellulose and the alkali-metal salts thereof, mixed ethers of cellulose such as methyl ethyl cellulose, and other cellulose ethers.

This invention is useful in the preparation of cellulose ethers and is an improvement over prior art processes for the production of such ethers, since close control of the viscosity of the ether is obtained and since the necessity of a cellulose ether manufacturer for maintaining a variety of viscosity grades of cellulose is eliminated.

What I claim and desire to protect by Letters Patent is:

1. In a process for the preparation of cellulose ethers in an etherification reaction mixture comprising alkali, cellulose and etherifying agent, the improvement which comprises introducing into the etherification reaction mixture a predetermined amount within the range from about 0.01 to about 0.25 mole for each anhydroglucose unit in the cellulose of a substance of the group consisting of alkali-metal hypochlorites, hypobromites, hypoiodites, peroxides, periodates and hydrogen peroxide to regulate the viscosity of the cellulose ether, and conducting the etherification reaction in the presence thereof.

2. In a process for the preparation of ethyl ethers of cellulose in an etherification reaction mixture comprising alkali, cellulose and ethylating agent, the improvement which comprises introducing into the etherification reaction mixture a predetermined amount within the range from about 0.01 to about 0.25 mole for each anhydroglucose unit in the cellulose of a substance of the group consisting of alkali-metal hypochlorites, hypobromites, hypoiodites, peroxides, periodates and hydrogen peroxide to regulate the viscosity of the ethyl cellulose, and conducting the etherification reaction in the presence thereof.

3. In a process for the preparation of carboxyalkyl ethers of cellulose in an etherification reaction mixture comprising alkali, cellulose and carboxyalkylating agent, the improvement which comprises introducing into the etherification reaction mixture a predetermined amount within the range from about 0.01 to about 0.25 mole for each anhydroglucose unit in the cellulose of a substance of the group consisting of alkali-metal hypochlorites, hypobromites, hypoiodites, peroxides, periodates and hydrogen peroxide to regulate the viscosity of the carboxyalkyl cellulose ether, and conducting the etherification reaction in the presence thereof.

4. In a process for the preparation of ethyl cellulose in an etherification reaction mixture comprising alkali, cellulose and ethyl chloride, the improvement which comprises introducing into the etherification reaction mixture a predetermined amount within the range from about 0.01 to about 0.25 mole for each anhydroglucose unit in the cellulose of sodium hyprochlorite to regulate the viscosity of the ethyl cellulose, and conducting the etherification reaction in the presence thereof.

5. In a process for the preparation of carboxymethylcellulose in an etherification reaction mixture comprising alkali, cellulose and sodium monochloroacetate, the improvement which comprises introducing into the etherification reaction mixture a predetermined amount within the range from about 0.01 to about 0.25 mole for each anhydroglucose unit in the cellulose of sodium hypochlorite to regulate the viscosity of the carboxymethylcellulose, and conducting the etherification reaction in the presence thereof.

EUGENE D. KLUG.

REFERENCES CITED

The following references are of record in the file of this patent:

UNITED STATES PATENTS

| Number | Name | Date |
|---|---|---|
| 1,938,360 | Traill | Dec. 5, 1933 |
| 2,159,376 | Freeman et al. | May 23, 1939 |

OTHER REFERENCES

Worden, "Technology of Cellulose Ethers," (1933) volume 111, page 1229.